US011616736B2

(12) United States Patent
Tsiaflakis

(10) Patent No.: US 11,616,736 B2
(45) Date of Patent: Mar. 28, 2023

(54) DYNAMIC RESOURCE ALLOCATION AIDED BY REINFORCEMENT LEARNING

(71) Applicant: Nokia Solutions and Networks OY, Espoo (FI)

(72) Inventor: Paschalis Tsiaflakis, Schriek (BE)

(73) Assignee: Nokia Solutions and Networks Oy, Espoo (FI)

( * ) Notice: Subject to any disclaimer, the term of this patent is extended or adjusted under 35 U.S.C. 154(b) by 116 days.

(21) Appl. No.: 17/124,533

(22) Filed: Dec. 17, 2020

(65) Prior Publication Data
US 2022/0200932 A1 Jun. 23, 2022

(51) Int. Cl.
| | | |
|---|---|---|
| *H04L 49/9005* | (2022.01) | |
| *G06N 20/00* | (2019.01) | |
| *G06K 9/62* | (2022.01) | |
| *H04L 47/52* | (2022.01) | |
| *H04L 47/62* | (2022.01) | |

(52) U.S. Cl.
CPC ........ *H04L 49/9005* (2013.01); *G06K 9/6262* (2013.01); *G06N 20/00* (2019.01); *H04L 47/522* (2013.01); *H04L 47/622* (2013.01); *H04L 47/6215* (2013.01)

(58) Field of Classification Search
CPC ............... H04L 49/9005; H04L 47/522; H04L 47/6215; H04L 47/622; G06K 9/6262; G06N 20/00
See application file for complete search history.

(56) References Cited

U.S. PATENT DOCUMENTS

| 8,923,672 B2 | 12/2014 | Bernasconi et al. |
| 2003/0035373 A1 | 2/2003 | Bass et al. |

(Continued)

FOREIGN PATENT DOCUMENTS

EP 3182636 A1 6/2017

OTHER PUBLICATIONS

Aihara Naoki, et al. "Q-Learning Aided Resource Allocation and Environment Recognition in LoRaWAN With CSMA/CA." IEEE Access, vol. 7 (2019): 152126-152137.
Capone, Antonio, et al. "Dynamic Resource Allocation in Communication Networks." Networking 2006, Lecture Notes in Computer Science, vol. 3976, Springer (2006): 892-903.
(Continued)

*Primary Examiner* — Oussama Roudani
(74) *Attorney, Agent, or Firm* — Mendelsohn Dunleavy, P.C.; Steve Mendelsohn; Yuri Gruzdkov

(57) ABSTRACT

A communication system in which DRA control is aided by RL. An example embodiment may control one or more buffer queues populated by downstream and/or upstream data streams. The egress rates of the buffer queues can be dynamically controlled using an RL technique, according to which a learning agent can adaptively change the state-to-action mapping function of the DRA controller while circumventing the RL exploration phase and relying on extrapolation of the already taken actions instead. This feature may result in at least two benefits: (i) cancellation of a performance penalty typically associated with RL exploration; and (ii) faster learning of the environment, as the learning agent can determine the performance metrics of many actions per state in a single occurrence of the state. In an example embodiment, the communication system may be a DSL system, a PON system, or a wireless communication system.

20 Claims, 12 Drawing Sheets

(56) References Cited

U.S. PATENT DOCUMENTS

| | | |
|---|---|---|
| 2015/0215922 A1* | 7/2015 | Bahk .................... H04L 47/193 |
| | | 370/235 |
| 2015/0381233 A1 | 12/2015 | Goodson et al. |
| 2018/0219640 A1 | 8/2018 | Kerpez et al. |
| 2019/0286486 A1 | 9/2019 | Ma et al. |
| 2020/0092622 A1 | 3/2020 | Oh et al. |
| 2021/0021346 A1* | 1/2021 | Ye ..................... H04Q 11/0067 |
| 2022/0104027 A1* | 3/2022 | Gao ..................... H04W 16/04 |
| 2022/0129828 A1* | 4/2022 | Yates .................... G06N 20/00 |
| 2022/0343161 A1* | 10/2022 | Restuccia .............. G06N 3/063 |
| 2022/0345376 A1* | 10/2022 | Sawabe ................. H04L 41/16 |

OTHER PUBLICATIONS

ITU-T, "G.9701 Amendment 2 (May 2020)—Fast access to subscriber terminals (G.fast)—Physical layer specification", Recommendation (2020): 1-524.
ITU-T, "G.9807.2 (Aug. 2017)—10 Gigabit-capable passive optical networks (XG(S)-PON): Reach extension", Recommendation (2017): 1-40.
IEEE, "802.11-2016—Part 11: Wireless LAN Medium Access Control (MAC) and Physical Layer (PHY) Specifications", Standard (2016): 1-3532.
Extended European Search Report and Written Opinion for corresponding European application No. 21209892.5; dated May 12, 2022 (9 pages).
Mehra, R. K., et al. "Towards Self-Learning Adaptive Scheduling for ATM networks." Proceedings of the 36th IEEE Conference on Decision and Control. San Diego, California. vol. 3. (1997): 2393-2398.

* cited by examiner

100

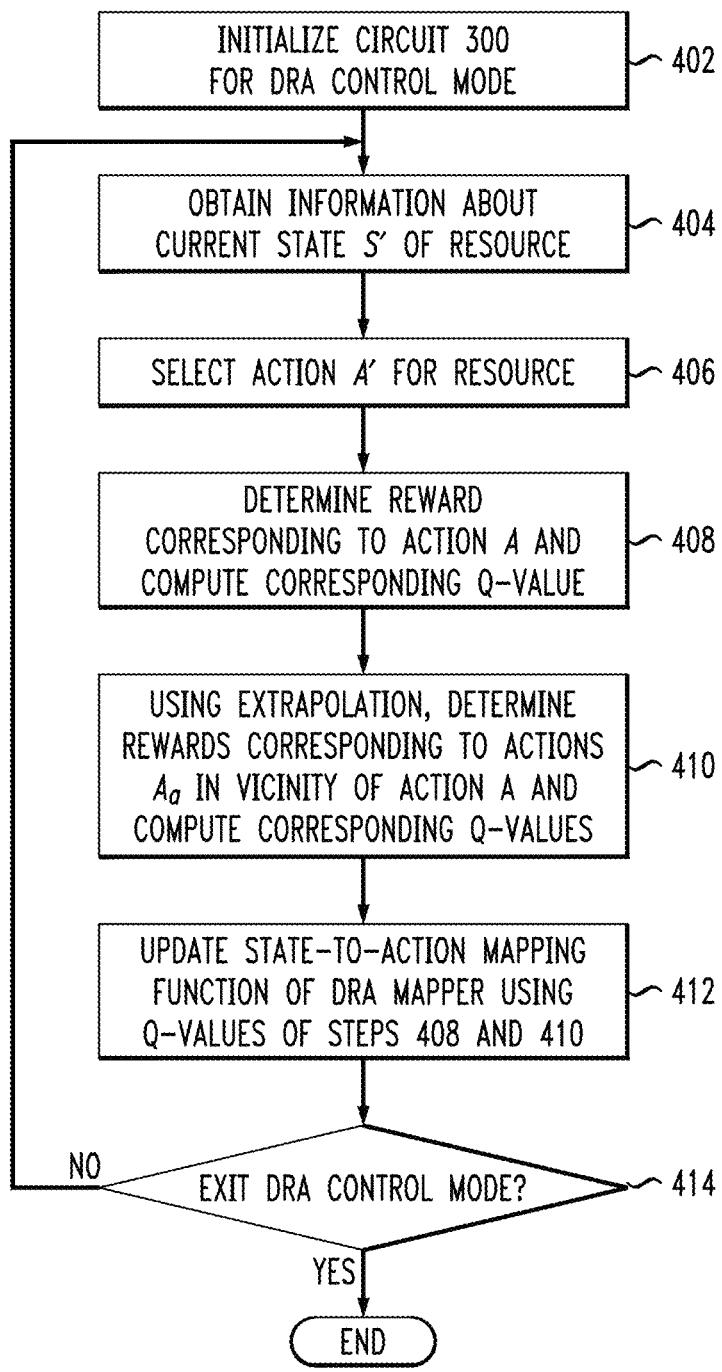

FIG. 11

| ALGORITHM / UPDATE PERIOD | FIXED ALLOCATION $M_1 = 18$ | PRIOR ART cDTA | cDTA USING METHOD 400 |
|---|---|---|---|
| 1 ms | -9.2533 | -3.6946 | -3.3799 |
| 6 ms | -1.5398 | -0.5907 | -0.4797 |
| 30 ms | -0.3085 | -0.0988 | -0.0658 |
| 50 ms | -0.1869 | -0.0526 | -0.0338 |
| 100 ms | -0.0952 | -0.0205 | -0.0128 |

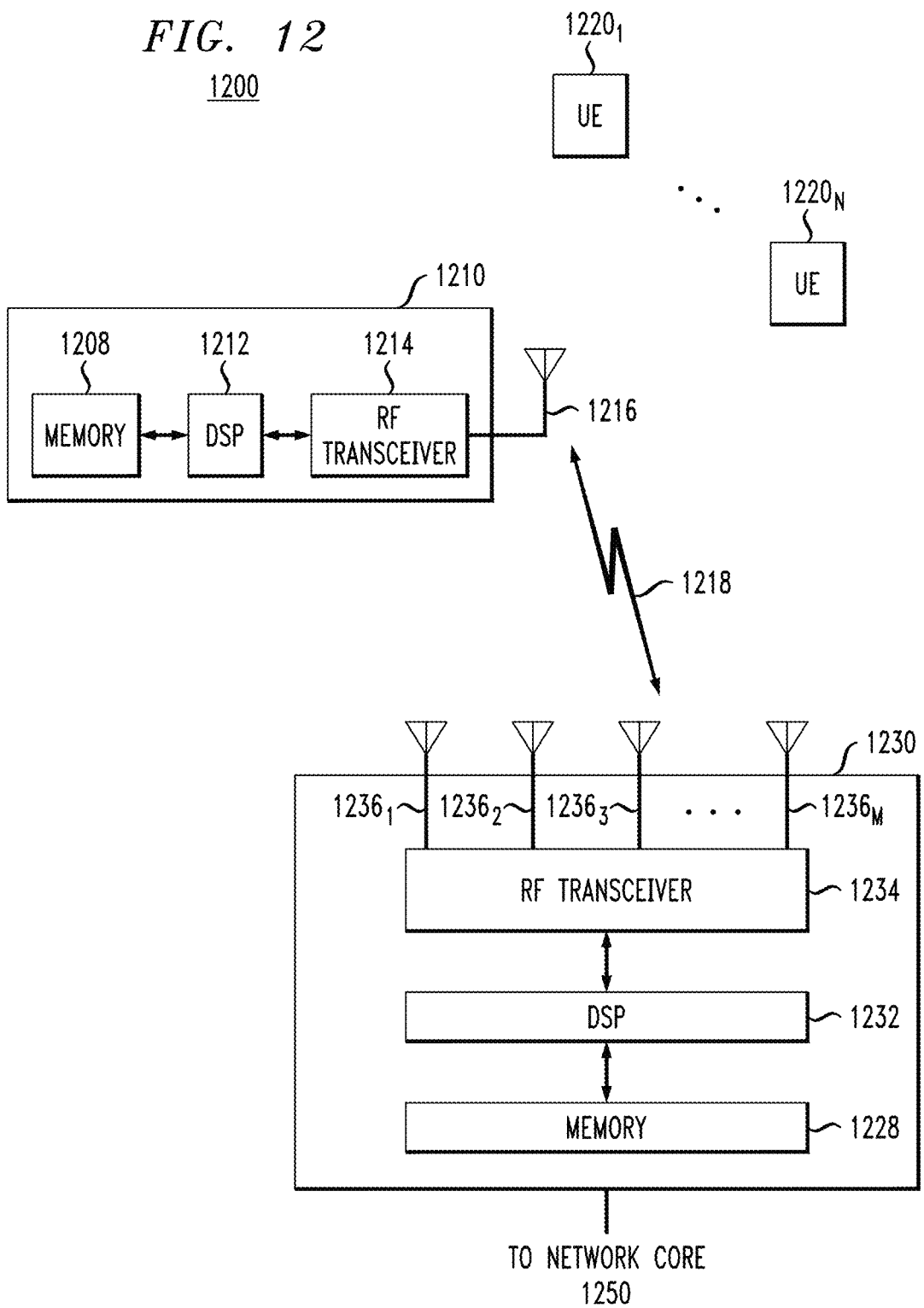

DYNAMIC RESOURCE ALLOCATION AIDED BY REINFORCEMENT LEARNING

BACKGROUND

Field

Various example embodiments relate to communication equipment and, more specifically but not exclusively, to methods and apparatus for dynamic resource allocation in a communication system.

Description of the Related Art

This section introduces aspects that may help facilitate a better understanding of the disclosure. Accordingly, the statements of this section are to be read in this light and are not to be understood as admissions about what is in the prior art or what is not in the prior art.

Dynamic-resource-allocation (DRA) algorithms are used, e.g., in communication networks to provide services that satisfy Quality-of-Service (QoS) requirements of individual users while supporting efficient utilization and sharing of pertinent network resources. A subtype of DRA is dynamic bandwidth allocation (DBA). In many network scenarios, dynamic provisioning of resources is proven to be superior to static provisioning of the same resources, e.g., in terms of the total acceptable network load and/or network revenue.

SUMMARY OF SOME SPECIFIC EMBODIMENTS

Disclosed herein are various embodiments of a communication system in which DRA control is aided by reinforcement learning (RL). An example embodiment may control one or more buffer queues populated by downstream and/or upstream data flows. The egress rates of the buffer queues can be dynamically controlled using an RL technique, according to which a learning agent can adaptively change the state-to-action mapping function of the DRA controller while circumventing the RL exploration phase and relying on extrapolation of the already taken actions instead. This feature may result in at least two benefits: (i) cancellation of a performance penalty typically associated with RL exploration; and (ii) faster learning of the environment, as the learning agent can determine the performance metrics of many actions per state in a single occurrence of the state.

Some embodiments may be implemented in a digital-subscriber-line (DSL) system.

Some embodiments may be implemented in a passive-optical-network (PON) system.

Some embodiments may be implemented in a wireless communication system.

According to an example embodiment, provided is an apparatus comprising: at least one processor; and at least one memory including program code; and wherein the at least one memory and the program code are configured to, with the at least one processor, cause the apparatus at least to: regulate an egress rate of a first buffer queue by selecting an egress-rate control parameter value of the first buffer queue for a next time interval based on quality values and on occupancy of the first buffer queue in a present time interval; and update a plurality of the quality values corresponding to a plurality of egress-rate control parameter values of the first buffer queue in the present time interval.

According to another example embodiment, provided is a non-transitory machine-readable medium, having encoded thereon program code, wherein, when the program code is executed by a machine, the machine implements a method comprising the steps of: (A) regulating an egress rate of a first buffer queue by selecting an egress-rate control parameter value of the first buffer queue for a next time interval based on quality values and on occupancy of the first buffer queue in a present time interval; and (B) updating a plurality of the quality values corresponding to a plurality of egress-rate control parameter values of the first buffer queue in the present time interval.

BRIEF DESCRIPTION OF THE DRAWINGS

Other aspects, features, and benefits of various disclosed embodiments will become more fully apparent, by way of example, from the following detailed description and the accompanying drawings, in which:

FIG. 4A shows a flowchart of a DRA control method that can be implemented using the circuit of FIG. 3 according to an embodiment;

FIG. 11 shows example improvements that can be achieved in the communication system of FIG. 1 according to an embodiment: and FIG. 12 shows a block diagram of yet another communication system in which some other embodiments can be practiced.

DETAILED DESCRIPTION

Figure 1:
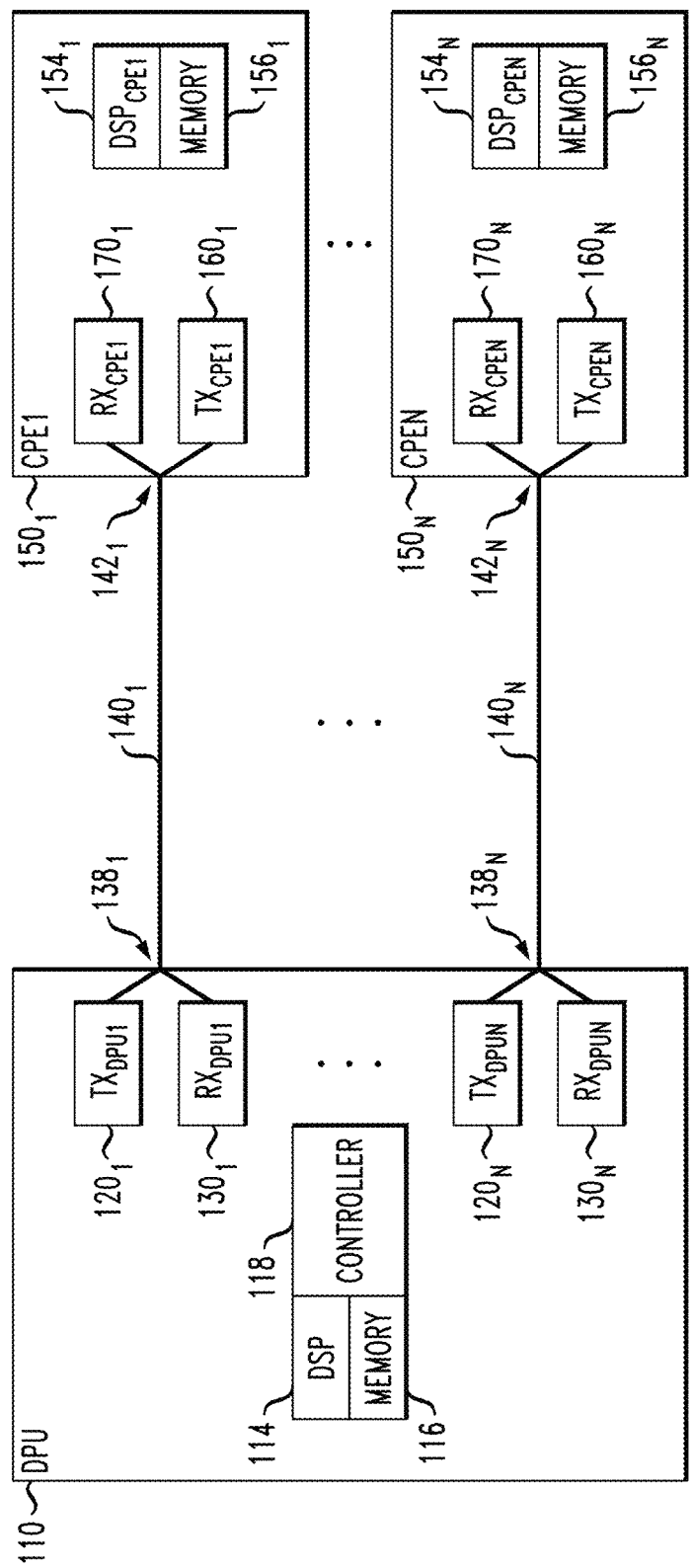
FIG. 1 shows a block diagram of a communication system in which some embodiments can be practiced.

FIG. 1 shows a block diagram of a communication system 100 in which some embodiments can be practiced. System 100 comprises a distribution point unit (DPU) 110 and a plurality of customer-premise-equipment (CPE) units $150_1$-$150_N$ connected by way of subscriber lines $140_1$-$140_N$ as indicated in FIG. 1. In some embodiments, DPU 110 may be located at a "central office" of the service provider (e.g., a telephone company). In some other embodiments, DPU 110 may be remotely deployed using one or more backhaul (e.g., optical) links to a location that is closer to the subscriber premises than that of the central office, and the corresponding equipment can be physically placed in a street cabinet, on a pole, in the basement of a building, etc. CPE units $150_1$-$150_N$ are typically located at different respective customer sites. In some embodiments, DPU 110 can be implemented and referred to as an access node (AN) 110 of the corresponding network (not explicitly shown in FIG. 1).

Each of subscriber lines $140_1$-$140_N$ typically comprises a respective "twisted-pair" (or other suitable) electrical cable configured to transmit signals corresponding to voice and/or data services. At DPU 110, each of subscriber lines $140_1$-$140_N$ is connected to a respective one of input/output (I/O) ports $138_1$-$138_N$. At the CPE side, each of subscriber lines $140_1$-$140_N$ is similarly connected to a respective one of I/O ports $142_1$-$142_N$, each being an I/O port of a respective one of CPE units $150_1$-$150_N$.

In an example embodiment, DPU (or AN) 110 comprises a plurality of transceivers ($120_i$/$130_i$), each internally connected to a respective one of I/O ports $138_1$-$138_N$, where i=1, 2, ..., N. A transceiver ($120_i$/$130_i$) includes a respective transmitter $120_i$ and a respective receiver $130_i$. DPU (or AN) 110 further comprises at least one digital signal processor (DSP) 114 operatively connected to transceivers ($120_i$/$130_i$) and at least one memory 116 to perform at least some of the signal processing and other functions needed for proper operation thereof. In operation, transceivers ($120_i$/$130_i$) may employ discrete multitone (DMT) modulation with adaptive bit loading and channel coding. The number of tones of a DMT symbol may range from 2048 to 8192 (or to 16384). To tackle crosstalk interference between different subscriber lines $140_1$-$140_N$ within a cable binder or on the access-node board, DPU (or AN) 110 may employ crosstalk-cancellation techniques, also referred to as vectoring.

In an example embodiment, a CPE unit $150_i$ comprises a transceiver ($160_i$/$170_i$) internally connected to I/O port $142_i$ of that CPE unit. A transceiver ($160_i$/$170_i$) includes a respective transmitter $160_i$ and a respective receiver $170_i$. CPE unit $150_i$ further comprises at least one DSP $154_i$ operatively connected to transceiver ($160_i$/$170_i$) and at least one memory $156_i$ to perform at least some of the signal processing and other functions needed for proper operation thereof.

In some embodiments, system 100 may be a digital-subscriber-line (DSL) system.

In some embodiments, system 100 may be designed to comply with ITU-T standardized broadband access technologies, such as G.fast and/or G.mgfast. G.fast is described in ITU-T Recommendation G.9701, which is incorporated herein by reference in its entirety. The first ITU-T recommendation for G.mgfast is currently in the comment-resolution phase and has not been made publically available yet. Each of these ITU-T recommendations describes a respective DRA feature.

For example, in G.9701, DRA is defined as a functionality that determines the downstream and upstream transmission opportunities for each time-division-duplexing (TDD) frame based on the occupancy of downstream and upstream QoS queues and within bounds selected by the operator through the DPU Management Information Base (MIB). This particular feature may also be used to implement iDTA (independent dynamic time assignment) and/or cDTA (coordinated dynamic time assignment). In an example embodiment, DRA can be performed seamlessly (e.g., without causing any loss of data or any violation in the order of the data) during showtime. In some cases, the DRA functionality may also be considered for managing power consumption, e.g., using the discontinuous operation mode. The upcoming G.mgfast (G.9711) specification has a DRA feature as well, with possible extensions to multi-user, full-duplex settings. Some other features proposed for G.mgfast, e.g., dynamic bandwidth redistribution for point-to-multi-point (P2MP) transmission and discontinuous time-frequency operation (DTFO), may also be classified as sub-types of DRA, e.g., because the corresponding resources can be dynamically reallocated to different end users on a millisecond time scale based on the perceived demand.

DPU (or AN) 110 comprises an electronic controller 118 that can be programmed to run and/or manage some or all of the above-mentioned DRA functions according to various embodiments disclosed herein. In some embodiments, electronic controller 118 can be implemented using a part of DSP 114. In at least some embodiments, some or all of DSPs 114 and $154_1$-$154_N$ and memories 116 and $156_1$-$156_N$ can also be used to support and/or implement at least some of the DRA functions.

Figure 2:
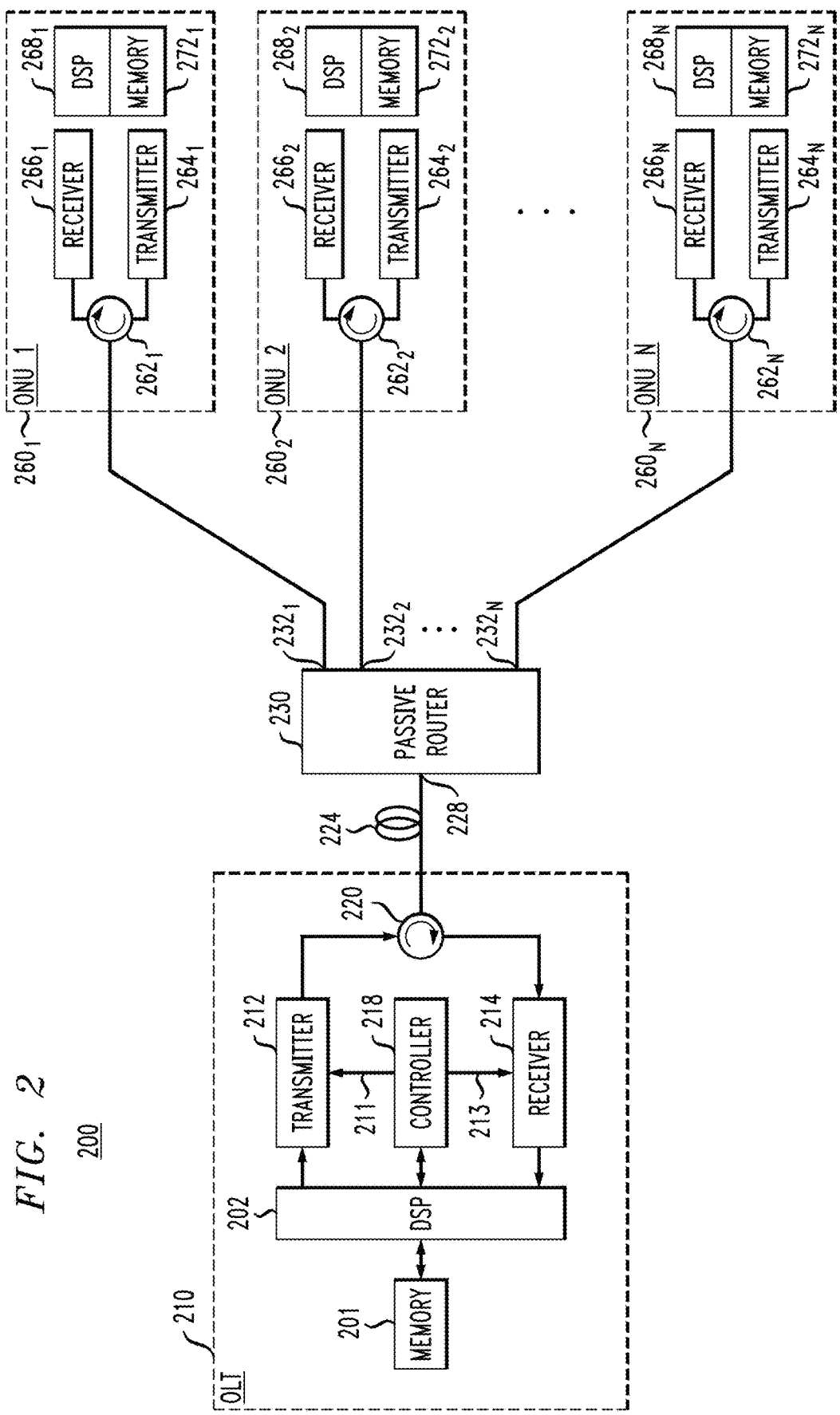
FIG. 2 shows a block diagram of another communication system in which some other embodiments can be practiced.

FIG. 2 shows a block diagram of a passive-optical-network (PON) system 200 in which some other embodiments can be practiced. System 200 has an optical line terminal (OLT) 210 configured to communicate with optical network units (ONUs) $260_1$-$260_N$. Herein, the number N can be, e.g., in the range from 2 to 256. In some cases, ONUs $260_1$-$260_N$ can be configured to use (nominally) the same carrier wavelength for upstream transmissions. In some other cases, ONUs $260_1$-$260_N$ can be configured to use different respective carrier wavelengths for upstream transmissions.

OLT 210 comprises an optical transmitter 212 and an optical receiver 214, both coupled, by way of an optical circulator 220 or other suitable directional optical coupler (e.g., an optical diplexer or triplexer based on thin-film technologies), to an optical fiber 224. Operation, functions, and configurations of transmitter 212 and receiver 214 can be managed and controlled using control signals 211 and 213 generated by an electronic controller 218, which can be a part of the corresponding processor (e.g., 202) in some embodiments. A DSP 202 coupled to a memory 201, transmitter 212, receiver 214, and controller 218 as indicated in FIG. 2 can be used for signal and data processing and, in some embodiments, for supporting some functions of the controller. In an example embodiment, optical fiber 224 can have a length between about 1 km and about 40 km.

Transmitter 212 is typically configured to broadcast downstream signals to ONUs $260_1$-$260_N$ using one or more downstream carrier wavelengths, with a suitable time-division multiplexing (TDM) protocol being used to transmit signals intended for different ONUs. Receiver 214 is configured to receive upstream signals from ONUs $260_1$-$260_N$ transmitted using one or more upstream carrier wavelengths. A suitable time division multiple access (TDMA) protocol executed using controller 218 can be used to prevent collisions, at receiver 214, of the upstream signals generated by different ONUs 260.

Optical fiber 224 connects OLT 210 to one or more passive routers 230. Depending on the embodiment, router 230 can be implemented using: (i) a (1×N) passive optical splitter/combiner; (ii) a passive wavelength router (e.g., an arrayed waveguide grating, AWG); or (iii) any suitable combination of wavelength-insensitive and/or wavelength-sensitive passive optical elements. A typical router 230 has (N+1) optical ports, including a single port 228 at its first or upstream side and a set of N ports $232_1$-$232_N$ at its second or downstream side. Herein, the term "side" is used in an abstract sense to indicate "upstream" or "downstream" directions rather than in a physical-orientation sense. Port 228 is internally optically connected to each of ports $232_1$-$232_N$. Port 228 is externally optically connected to optical fiber 224 as indicated in FIG. 2. Ports $232_1$-$232_N$ are externally optically connected to ONUs $260_1$-$260_N$, respectively, e.g., via optical fibers, as further indicated in FIG. 2, or via more complex, passive optical-fiber networks (not explicitly shown in FIG. 2). Example devices that can be used to implement router 230 are disclosed, e.g., in U.S. Pat. No. 8,923,672, which is incorporated herein by reference in its entirety.

In an example embodiment, each of ONUs $260_1$-$260_N$ includes a respective optical circulator $262_i$ or other suitable directional optical coupler, a respective optical transmitter $264_i$, a respective optical receiver $266_i$, at least one respective DSP $268_i$, and at least one respective memory $272_i$. Optical circulator $262_i$ is configured to (i) direct downstream signals received from passive router 230 to optical receiver $266_i$ and (ii) direct upstream signals from optical transmitter $264_i$ to passive router 230. DSP $268_i$ is operatively connected to optical transmitter $264_i$ and optical receiver $266_i$ to perform at least some of the signal processing and other functions needed for proper operation thereof.

In an example commercial application, system 200 can be configured to operate such that all downstream signals are spectrally located in a spectral band near 1.55 µm, and all upstream signals are spectrally located in a spectral band near 1.3 µm, or vice versa. In such cases, all or some of optical circulators 220 and 262 may be replaced by respective optical band-pass or dichroic optical filters.

While FIG. 2 illustrates a PON system with a single passive optical router 230, more-complex PON architectures are also possible, such as PON architectures having multiple passive optical routers and tree-and-branch sub-topologies.

In some embodiments, system 200 may be based on Gigabit-PON (G-PON), Ethernet-PON (E-PON), and/or Gigabit-capable symmetric PON (XGS-PON) technologies, in which the fiber plant is TDM-shared by different ONUs 260. In some other embodiments, system 200 may be based on a Next-Generation PON-2 (NG-PON2) technology, according to which several sub-systems thereof operating at different wavelengths are "stacked" on a shared PON infrastructure, thereby implementing a time- and wavelength-division multiplexing (TWDM) PON configuration. In yet some other embodiments, system 200 may be configured to operate in accordance with a next-generation TDM-PON standard for 25G/50G speeds, also referred to as G.hsp.

In some embodiments, controller 218 may be configured for DBA to enable OLT 210 to allocate upstream transmission opportunities (in a TDM fashion) to various traffic-bearing entities within ONUs 260, e.g., based on dynamic indication of their activity and traffic contracts. The activity-status indication can be either explicit (e.g., through buffer-status reporting) or implicit (e.g., through transmission of idle XGPON-Encapsulation-Method (XGEM) frames during upstream transmission opportunities), or both. In some embodiments, system 200 may be designed to comply with ITU-T Recommendation G.9807.2, which is incorporated herein by reference in its entirety.

For example, under XGS-PON specifications, the recipient entity of the upstream bandwidth allocation is represented by an allocation ID (Alloc-ID). Regardless of the number of Alloc-IDs assigned to each ONU, the number of XGEM ports multiplexed onto each Alloc-ID, and the actual physical and logical queuing structure implemented by the ONUs, the OLT may model the traffic aggregate associated with each subtending Alloc-ID as a single logical buffer. Furthermore, for purposes of bandwidth assignment, the OLT may consider all Alloc-IDs as independent peer entities residing at the same level of the corresponding logical hierarchy.

For each Alloc-ID logical buffer, controller 218 may be configured to infer the buffer's occupancy by either collecting in-band status reports or observing the upstream idle patterns, or both. The DBA function of controller 218 may then provide an input to an OLT upstream scheduler, which is responsible for generating the corresponding bandwidth maps (BWmaps). In an example implementation, a BWmap specifies the size and timing of upstream transmission opportunities for each Alloc-ID and is communicated to ONUs 260 in-band, e.g., with the downstream traffic.

In some embodiments, the DBA function of controller 218 may include the following sub-functions:
  (i) inference of the occupancy status of a logical upstream transmit buffer;
  (ii) update of the assigned bandwidth according to the inferred buffer occupancy status within the provisioned bandwidth component parameters;
  (iii) issue of allocations according to the updated bandwidth; and
  (iv) management of at least some DBA operations.
These sub-functions may be applied at the level of individual Alloc-IDs and their provisioned bandwidth component parameters.

Depending on the ONU buffer-occupancy-inference mechanism, at least two different DBA methods may be implemented using controller 218:
  (A) status-reporting DBA, based on explicit buffer occupancy reports solicited by OLT 210 and submitted by ONUs 260 in response to the solicitation; and
  (B) traffic-monitoring DBA, based on the OLT's observation of idle XGEM frame patterns and their comparison with the corresponding bandwidth maps.

Controller 218 can be programmed to run and/or manage some or all of the above-mentioned DBA functions and sub-functions according to various embodiments disclosed herein. In at least some embodiments, some or all of DSPs 202 and $268_1$-$268_N$ and memories 201 and $272_1$-$272_N$ can also be used to support and/or implement at least some of the DBA functions and sub-functions.

As used herein, the term "DRA" should be construed to encompass some or all of the following features:
  I. at least one buffer queue configured to buffer incoming bit streams and/or data units (e.g., packets) for further transmission over the corresponding link, e.g., upstream or downstream;
  II. obtaining traffic measurements and/or estimates corresponding to at least one buffer queue, e.g., characterizing the actual traffic arriving to, residing in, and/or passing through the buffer queue;
  III. using traffic measurements and/or estimates as inputs to the pertinent DRA (or DBA) algorithm that controls some parameters of the corresponding data link, e.g., the egress rate(s) and/or constraints thereon under the pertinent optimization objective(s), such as achieving a high throughput, reducing power consumption, reducing delays, achieving specified QoS metrics, reducing congestion, etc.

Herein, the egress rate is the output rate of the corresponding buffer queue.

Conventional DRA algorithms for xDSL or PON typically do not provision resources based on predicted patterns of the traffic arriving to, residing in, or passing through the buffer queues. Furthermore, conventional DRA algorithms tend to rely on a fixed mapping between traffic metrics and DRA-control outputs (e.g., constraints on the egress rate(s) of the buffer queues). Still further, conventional DRA algorithms do not typically lend themselves to optimization based on an arbitrary objective (e.g., an arbitrary cost function). For example, if a DRA algorithm needs to be altered to make a particular tradeoff, e.g., involving latency and/or power consumption, or to consider constraints on the dynamicity of resource allocations, then the corresponding modifications may be rather difficult to implement. As such, conventional DRA algorithms tend to provide suboptimal performance in at least some traffic scenarios and tend to be difficult to tune.

These and possibly some other related problems in the state of the art can beneficially be addressed using at least some embodiments disclosed herein, according to which DRA control can be aided by reinforcement learning. An example embodiment may rely on a DRA controller, e.g., implemented as a part of controller 118 (FIG. 1) or controller 218 (FIG. 2), to control one or more (logical or physical) buffer queues populated by downstream and/or upstream ingress data streams, with the egress rate(s) thereof being dynamically changed and/or capped using a novel reinforcement-learning technique, which is described in more detail below. In an example embodiment, such a DRA controller may employ:
    a functionality that fetches traffic information, such as status reports (e.g., providing buffer-queue occupancy metrics) and/or traffic monitoring data (e.g., actual numbers of transferred data units, ingress rate(s), egress rate(s), etc.);
    a DRA algorithm configured to map the fetched traffic information to a control output that can change or constraint the egress rate(s) of the buffer queue(s); and
    a learning agent configured to adaptively change the mapping function of the DRA algorithm while circumventing explicit RL exploration and relying on extrapolation of the taken actions instead.
The learning agent may be capable of some or all of the following:
    changing the above-mentioned mapping functionality of the DRA algorithm based on: (i) the actual traffic that arrives at, resides in, and/or passes through the buffer queue(s); and (ii) an optimization objective given as an input to the learning agent by the system designer/implementer or by the network operator;
    changing the above-mentioned mapping functionality of the DRA algorithm online and/or on the fly, e.g., without disrupting the flow of payload data; and
    changing the above-mentioned mapping functionality of the DRA algorithm without performing random and/or grossly suboptimal actions in an effort to learn the environment.
The last feature may result in at least two benefits: (i) cancellation of an additional performance penalty typically associated with explicit RL exploration; and (ii) faster learning of the environment, as the learning agent can determine the performance metrics of many actions per state in a single occurrence of the state.

Herein, the term "reinforcement learning" (or RL) generally refers to an area of machine learning concerned with how software and/or hardware control agents (e.g., electronic controllers) ought to take actions in an environment to optimize (e.g., maximize) some benefit (e.g., cumulative reward). RL is one of three basic machine-learning paradigms, which also include supervised learning and unsupervised learning. In a conventional implementation, RL may be applied to achieve an acceptable balance between exploration of the uncharted territory and exploitation of the currently available knowledge of the environment.

The environment for RL may be formulated in the form of a Markov decision process (MDP), e.g., because many RL algorithms so formulated may utilize dynamic programming techniques. One noticeable difference between classical dynamic programming methods and RL algorithms is that the latter do not assume knowledge of an exact mathematical model of the MDP and tend to be applied to relatively large MDPs for which more-exact methods may not be technically feasible.

RL, due to its generality, is used in many disciplines, such as game theory, control theory, operations research, information theory, simulation-based optimization, multi-agent systems, swarm intelligence, statistics, and genetic algorithms. In some literature, RL may also be referred to as approximate dynamic programming or neuro-dynamic programming.

A conventional RL algorithm, such as the SARSA algorithm, typically has two separate phases: the exploration phase and the exploitation phase. Herein, SARSA stands for state-action-reward-state-action. The RL algorithm can be run by an agent, e.g., an electronic controller, that can interact with the environment, e.g., represented by controllable circuits and devices. The agent can observe different states in the environment and take actions. In response to an action, the observed state may change, and the agent may get a reward. Q-values are used to quantify the quality of actions. For example, in the SARSA algorithm, the main function for updating the Q-value depends on the current state $S_1$, the action $A_1$ the agent chooses in the state $S_1$, the reward the agent gets for choosing the action $A_1$, the state $S_2$ that is observed after the action $A_1$ is taken, and the next action $A_2$ the agent chooses in the state $S_2$.

One simple policy that can be used by the agent to select the next action is referred to as the greedy policy. The greedy policy is aimed at maximizing the Q-value, but is known as being susceptible to converging to a suboptimal steady state. A modification of the greedy policy is referred to as the ε-greedy policy. Under the latter policy, with the probability of (1−ε), the agent takes action using the greedy policy. With the probability of ε, the agent takes a random action. Herein, the factor ε represents a tradeoff between exploitation of the available knowledge and continued exploration of the environment.

As already indicated above, due to the very nature of their selection, random actions may be grossly suboptimal for the present state of the environment and, as such, often incur a sizable performance penalty. In contrast, embodiments disclosed herein are advantageously designed to avoid such random actions during the exploitation phase. Furthermore, at least some embodiments may advantageously be able to also avoid the separate exploration phase altogether. Instead, the knowledge of the environment is built up by the agent based on extrapolation from the observed states, taken actions, and/or received rewards, e.g., as described below.

Figure 3:
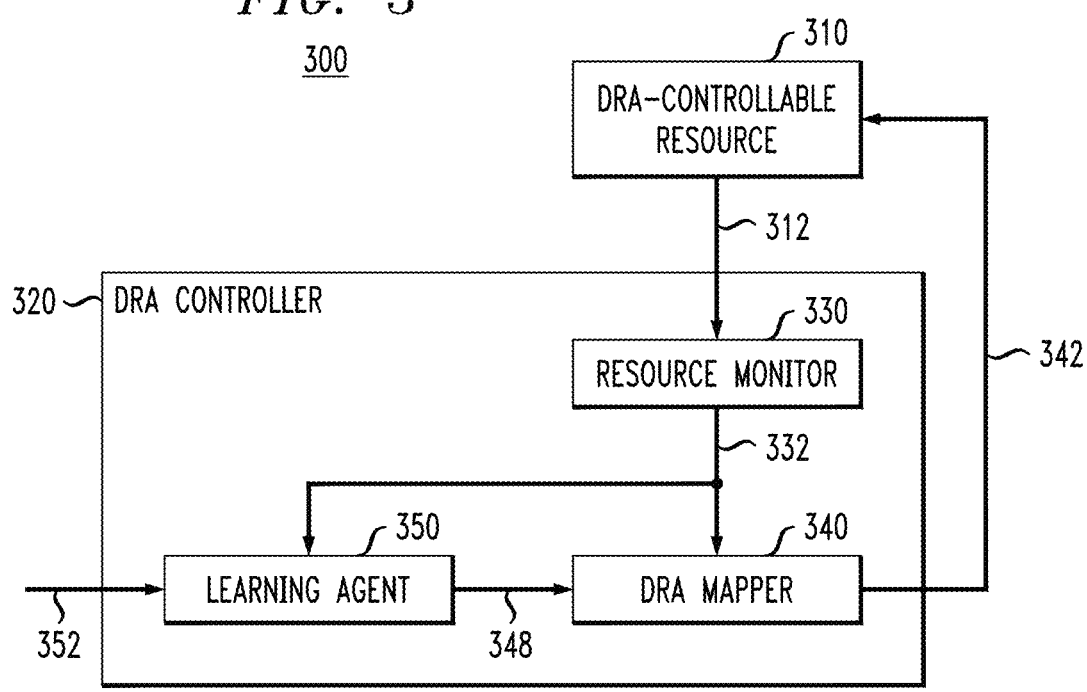
FIG. 3 shows a block diagram of a circuit that can be used in the communication systems of FIGS. 1-2 according to an embodiment.

FIG. 3 shows a block diagram of a circuit 300 according to an embodiment. Circuit 300 comprises a DRA-controllable resource 310 and a DRA controller 320. Under the above-explained RL terminology, resource 300 is a part of the environment, and controller 320 represents the agent. Different embodiments of circuit 300 may be adapted for use in systems 100 and 200.

In an example embodiment, resource 310 may comprise one or more buffer queues whose egress rates can be controlled by DRA controller 320.

Controller 320 comprises a resource monitor 330, a DRA mapper 340, and a learning agent 350.

Resource monitor 330 operates to obtain resource-metering information 312 by monitoring selected performance metrics of resource 310. In some embodiments, resource monitor 330 may obtain information 312 through direct reporting from resource 310. In some other embodiments, information 312 may be inferred by resource monitor 330 based on observations and/or measurements of certain performance parameters/characteristics of resource 310. Resource monitor 330 further operates to use information 312 to determine the current state of resource 310. Herein, the term "state" is used in the sense consistent with the conventional terminology used in the field of reinforcement learning. Resource monitor 330 then communicates the determined state of resource 310, by way of a control signal 332, to DRA mapper 340 and learning agent 350.

In response to control signal 332, DRA mapper 340 selects an action and communicates the selection, via a control signal 342, to resource 310. In response to control signal 342, resource 310 implements the selected action. In an example embodiment, DRA mapper 340 selects an action based on a lookup table (LUT) wherein different states are mapped onto actions. Different actions may be represented in the LUT by different sets of control-parameter value(s). For example, in some embodiments, a control-parameter value may be the egress rate of at least one buffer queue. In some other embodiments, a control parameter value may represent an upper limit to the egress rate(s). In yet some other embodiments, a control parameter can represent a parameter used in a mathematical function for determining the egress rate(s).

In some alternative embodiments, DRA mapper 340 may employ an artificial neural network (ANN) to implement the state-to-action mapping. As used herein, the term "ANN" refers to a distributed and typically nonlinear trainable circuit or machine constructed using a plurality of processing elements (PEs). Also, an ANN may be dynamically adaptive. Each PE has connections with one or more other PEs. The plurality of connections between the PEs defines the ANN's topology. In some topologies, the PEs may be aggregated into layers. Different layers may have different types of PEs configured to perform different respective kinds of transformations on their inputs. Signals may travel from the first PE layer (typically referred to as the input layer) to the last PE layer (typically referred to as the output layer). In some topologies, the ANN may have one or more intermediate PE layers (typically referred to as the hidden layers) located between the input and output PE layers. An example PE may scale, sum, and bias the incoming signals and use an activation function to produce an output signal that is a static nonlinear function of the biased sum. The resulting PE output may become either one of the ANN's outputs or be sent to one or more other PEs through the corresponding connection(s). The respective weights and/or biases applied by individual PEs can be changed during the training (or learning) mode of operation and are typically temporarily fixed (constant) during the payload (or working) mode of operation.

In an example embodiment, learning agent 350 operates to populate and update the LUT of DRA mapper 340, e.g., via a control signal 348. For example, in response to control signal 332 received from resource monitor 330, learning agent 350 may determine the reward from the previously taken action, the new state of resource 310, and an update for the LUT of DRA mapper 340. Such an update may be generated in accordance with an optimization objective or cost function 352 provided to learning agent 350 by an external (e.g., network or system) control entity and based on the corresponding greedy policy. As such, the state-to-action mapping implemented by DRA mapper 340 does not typically cause a selection of any random or suboptimal actions for resource 310. In addition, LUT updates 348 do not require a separate RL exploration phase, e.g., as further explained below.

FIG. 4A shows a flowchart of a DRA control method 400 that can be implemented using circuit 300 according to an embodiment. In some embodiments, method 400 can be implemented using some elements of the SARSA algorithm. Herein, the description of method 400 generally adheres to the conventional terminology used in the field of reinforcement learning.

Method 400 begins at step 402, where circuit 300 is initialized for RL-aided DRA. For example, step 402 may be used to select and set the initial values of relevant algorithm and/or circuit-configuration parameters. One subset of those parameters may be changed in the subsequent processing steps of method 400. Another subset of those parameters may remain fixed in the subsequent processing steps of method 400.

The following description outlines some example substeps that may be performed at step 402.

A discrete set {A} of available actions may be defined. In one example embodiment, the set {A} may include a set of egress rates that can be imposed by DRA controller 320 on one or more buffer queues of resource 310.

One or more features of a state may be defined. In general, a feature may be represented by any suitable function of information 312 and/or of derivatives thereof. Different features may correspond to different subsets of information 312.

A plurality of states S may be defined using the corresponding features. In some embodiments, the states S may be discrete, with a well-defined border between them. In some other embodiments, gradual transitions between the states may be used.

The reward function R and the Q-value function Q may be defined. Typically, R=R(S,A) and Q=Q(S,A). In other words, the rewards and Q-values depend both on the state and the action taken in that state. The reward function R may be specified using control signal 352 (FIG. 3). Eq. (1) gives an example recursive-update formula for the Q-values:

$$Q(S,A) \leftarrow Q(S,A) + \alpha[R + \gamma Q(S',A') - Q(S,A)] \quad (1)$$

Herein, (S, A) is the previous state-action pair, and (S', A') is the present state-action pair. The parameter $\alpha$ is the learning rate that determines to what extent the newly acquired knowledge supersedes the old knowledge in the LUT or ANN of DRA mapper 340. For example, setting the learning rate $\alpha$ to zero will make the agent not learn anything, while the learning rate $\alpha$ of 1 would make the agent consider only the most recent knowledge. In an example embodiment, the learning rate $\alpha$ can be $\alpha$=0.1. The parameter $\gamma$ is the discount factor that determines the importance of future rewards. For example, the discount factor of zero makes the agent consider only current rewards, while the discount factor that is close to 1 will make the agent strive for a high long-term reward. In an example embodiment, the discount factor $\gamma$ can be $\gamma$=0.3.

Circuit 300 may then be allowed to operate for a predetermined amount of time using the initial settings of step 402 to enable the pertinent circuits to make the idle-to-active transition and to perform some pertinent measurements.

At step 404, resource monitor 330 obtains information 312 and determines the present state S' of resource 310, e.g., as already indicated above in reference to FIG. 3. Resource monitor 330 then communicates the determined state S', by way of control signal 332, to DRA mapper 340 and learning agent 350.

At step 406, in response to the control signal 332 of step 404, DRA mapper 340 selects an action A' and communicates this selection, via control signal 342, to resource 310. In response to control signal 342, resource 310 implements the selected action A'.

At step 408, in response to control signal 332 of step 404, learning agent 350 determines the reward corresponding to the action A taken at step 406 of the previous processing loop of method 400, e.g., based on the reward function R(S,A) of step 402. Learning agent 350 then uses the determined reward to compute the corresponding Q-value, e.g., using Eq. (1) or a functionally analogous construct.

At step 410, learning agent 350 first operates to determine the reward(s) corresponding to one or more other actions, $A_a$ ($\neq A$), that could have been selected at step 406 for the corresponding state S of the previous processing loop. This determination is only possible for some, but not all, types of resources 310. For example, this particular sub-step of step 410 can be reliably executed for the resource 310 represented by one or more buffer queues. Example mathematical formulas that can be used to implement step 410 in this case are provided below (see, e.g., Eq. (5)).

In a following sub-step of step 410, learning agent 350 operates to compute the Q-value(s) corresponding to the one or more actions $A_a$, e.g., using Eq. (1) or a functionally analogous construct.

In general, for step 410 to be feasible, the behavior of the corresponding resource 310 needs to be sufficiently deterministic in the vicinity of action A such that suitable extrapolation methods can be applied to reliably determine the rewards corresponding to the one or more actions $A_a$ from said vicinity. Herein, the term "vicinity" means that the distance between actions A and $A_a$ in the corresponding parameter space is relatively small, e.g., $\|A-A_a\| < a_0$, where $a_0$ is a constant. In some embodiments, the whole range of available actions may be in the vicinity of action A.

At step 412, learning agent 350 generates an appropriate control signal 348 to update the state-to-action mapping function of DRA mapper 340. In an example embodiment, this update can be performed in a conventional manner based on the Q-value computed at step 408 for the action A and the Q-value(s) computed at step 410 for one or more actions $A_a$.

Step 414 serves to determine whether or not to exit the DRA control mode of operation. In general, any suitable criteria may be used for making this decision at step 414. If the decision is to exit, then the processing of method 400 is terminated, and circuit 300 may be switched into a different operating mode. Otherwise, the processing of method 400 is directed back to step 404.

Figure 4B:
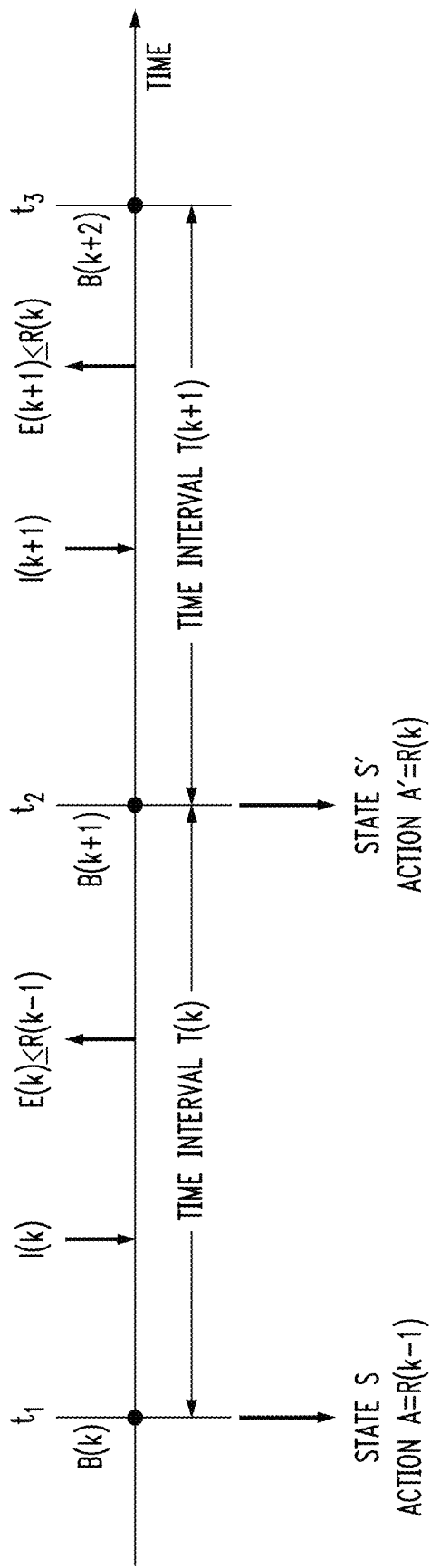
FIG. 4B illustrates an example relative timeline of certain steps of the DRA control method of FIG. 4A according to an embodiment.
Figure 5:
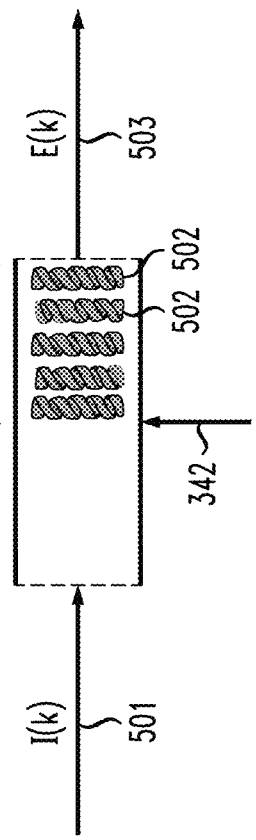
FIG. 5 schematically shows a buffer queue that can be a part of the circuit of FIG. 3 according to an embodiment.

FIG. 4B illustrates an example relative timeline of certain steps of DRA control method 400 (FIG. 4A) according to an embodiment. In this particular embodiment, resource 310 comprises a buffer queue, such as a buffer queue 500 (FIG. 5).

The time axis of FIG. 4B shows a time range between time $t_1$ and time $t_3$ ($>t_1$). The first of two time intervals shown in FIG. 4B, which is labeled T(k), is between times $t_1$ and $t_2$, where $t_1 < t_2 < t_3$. The second of the two time intervals, which is labeled T(k+1), is between the times $t_2$ and $t_3$. In operation, the buffer queue is populated by an ingress traffic flow and is emptied by an egress traffic flow. The following notation is used in FIG. 4B:

B(k) is the buffer-queue occupancy (fill) at the beginning of time interval T(k);

B(k+1) is the buffer-queue occupancy at the end of time interval T(k) or, equally, at the beginning of time interval T(k+1);

B(k+2) is the buffer-queue occupancy at the end of time interval T(k+1);

I(k) is the volume of the ingress flow in time interval T(k);

I(k+1) is the volume of the ingress flow in time interval T(k+1);

E(k) is the volume of the egress flow in time interval T(k);

E(k+1) is the volume of the egress flow in time interval T(k+1);

R(k−1) is a control parameter in effect during time interval T(k);

R(k) is a similar control parameter in effect during time interval T(k+1).

The first instance of step 404 during the time range of FIG. 4B is based on B(k) (and/or I(k−1), E(k−1); see Eq. (2)) and is used to determine the state S in which resource 310 is at time $t_1$. The corresponding instance of step 406 is then used to select the action A=R(k−1). The selection made in this instance of step 406 is based on the LUT of DRA mapper 340 that exists therein at the time of that selection. Since the last update of the LUT was at an earlier time than the time of this particular instance of step 406, the time index of the control parameter R(k−1) to be used in the time interval T(k) is shown in FIG. 4B as being (k−1).

The second instance of step 404 during the time range of FIG. 4B is based on B(k+1) (and/or I(k), E(k); see Eq. (2)) and is used to determine the state S' in which resource 310 is at time $t_2$. The corresponding instances of steps 408-412 may then be used to update the LUT of DRA mapper 340. The corresponding (second) instance of step 406 is then used to select the action A'=R(k), with the selection occurring after the LUT update.

A person of ordinary skill in the art will understand that the above-indicated time sequence of steps may be repeated in the following time interval(s) (not explicitly shown in FIG. 4B).

FIG. 5 schematically shows operation of a buffer queue 500 according to an embodiment. Buffer queue 500 can be a part of resource 310 and can be controlled using control signal 342 (also see FIG. 3) generated using the corresponding embodiment of method 400 (FIG. 4A). The following description of buffer queue 500 is given in continued reference to FIGS. 3-5.

In operation, buffer queue 500 is populated by an ingress traffic flow 501 having an unknown rate and dynamicity. The traffic flow may be in the form of data units (e.g., data packets) 502, five of which are shown in FIG. 5 for illustration purposes as being temporarily stored in buffer queue 500. Buffer queue 500 is emptied by an egress traffic flow 503. The egress rate of buffer queue 500 can be controlled by way of control signal 342. An example optimization objective 352 (FIG. 3) used for generating control signal 342 can be to minimize a weighted tradeoff between the buffer-queue fill (which is related to delay) and the unutilized capacity. The notation used in the following description of buffer queue 500 is consistent with the notation explained above in reference to FIG. 4B.

Eq. (2) can be used to describe the dynamics of buffer queue 500 as follows:

$$B(k+1)=B(k)+1(k)-E(k) \qquad (2)$$

where E(k) is constrained by Eq. (3):

$$E(k) = \min(B(k) + I(k), R(k-1)) \quad (3)$$

Resource-metering information 312 (FIG. 3) may comprise, e.g., the values of B(k) and I(k).

Step 408 of method 400 (FIG. 4A) can be implemented, e.g., using Eq. (4):

$$R(S,A) = -\max(0, B(k) + I(k) - A) - \beta \cdot \max(0, A - B(k) - I(k)) \quad (4)$$

where R(S,A) is the reward corresponding to the state S and action A; and β is a constant representing the selected tradeoff between the fill and unutilized capacity of buffer queue 500.

Step 410 (FIG. 4A) can be implemented, e.g., using Eq. (5):

$$\forall A_a : R(S, A_a) = -\max(0, B(k) + I(k) - A_a) - \beta \cdot \max(0, A_a - B(k) - I(k)) \quad (5)$$

Eq. (5) can be viewed as an extrapolation of Eq. (4) to actions other than the action A.

Step 412 of method 400 (FIG. 4A) can be implemented, e.g., using Eq. (6):

$$Q(S,a) \leftarrow \gamma \cdot Q(S,a) + R(S,a) \quad (6)$$

where $a \in \{A, A_a\}$.

After the processing of method 400 loops back up from step 412, the next step 404 (see FIG. 4A) can be implemented, e.g., using Eq. (7):

$$S' = F(B(k+1), I(k)) \quad (7)$$

where F(•) is a suitable integer-valued function of two arguments (also see Eq. (10)).

The next step 406 of method 400 (FIG. 4A) can then be implemented, e.g., using

Eq. (8):

$$A' = \arg\max_a [Q(S', a)/c] \quad (8)$$

where c is a normalization constant; and a represents any action from the set of available actions. Note that Eq. (8) represents a greedy selection policy.

In various embodiments, buffer queue 500 can be in system 100 (FIG. 1) or in system 200. As such, the processing exemplified by Eqs. (2)-(8) can be adapted for either system, e.g., as further illustrated below.

For example, in DBA control applied to upstream transmissions in system 200, the optimization objective 352 may be to allocate resources for each upstream traffic-bearing entity such that a beneficial tradeoff between delay (related to the buffer-queue occupancy) and bandwidth efficiency can be achieved. In this case, buffer queue 500 can be an upstream buffer queue of a traffic-bearing entity in system 200, wherein the egress rate corresponds to the actual traffic being sent in the upstream direction, and the control parameter R corresponds to the maximum amount of bandwidth resources that can be allocated to that traffic-bearing entity.

At step 402 of method 400 (FIG. 4A), the following state definition may be used:

$$S = \text{discrete}(I(k), L) \quad (9)$$

A person of ordinary skill in the art will understand that Eq. (9) relies on quantization of the applicable range of ingress rates into L discrete levels. This state definition can then be used to devise a corresponding function F for Eq. (7).

Figure 6:
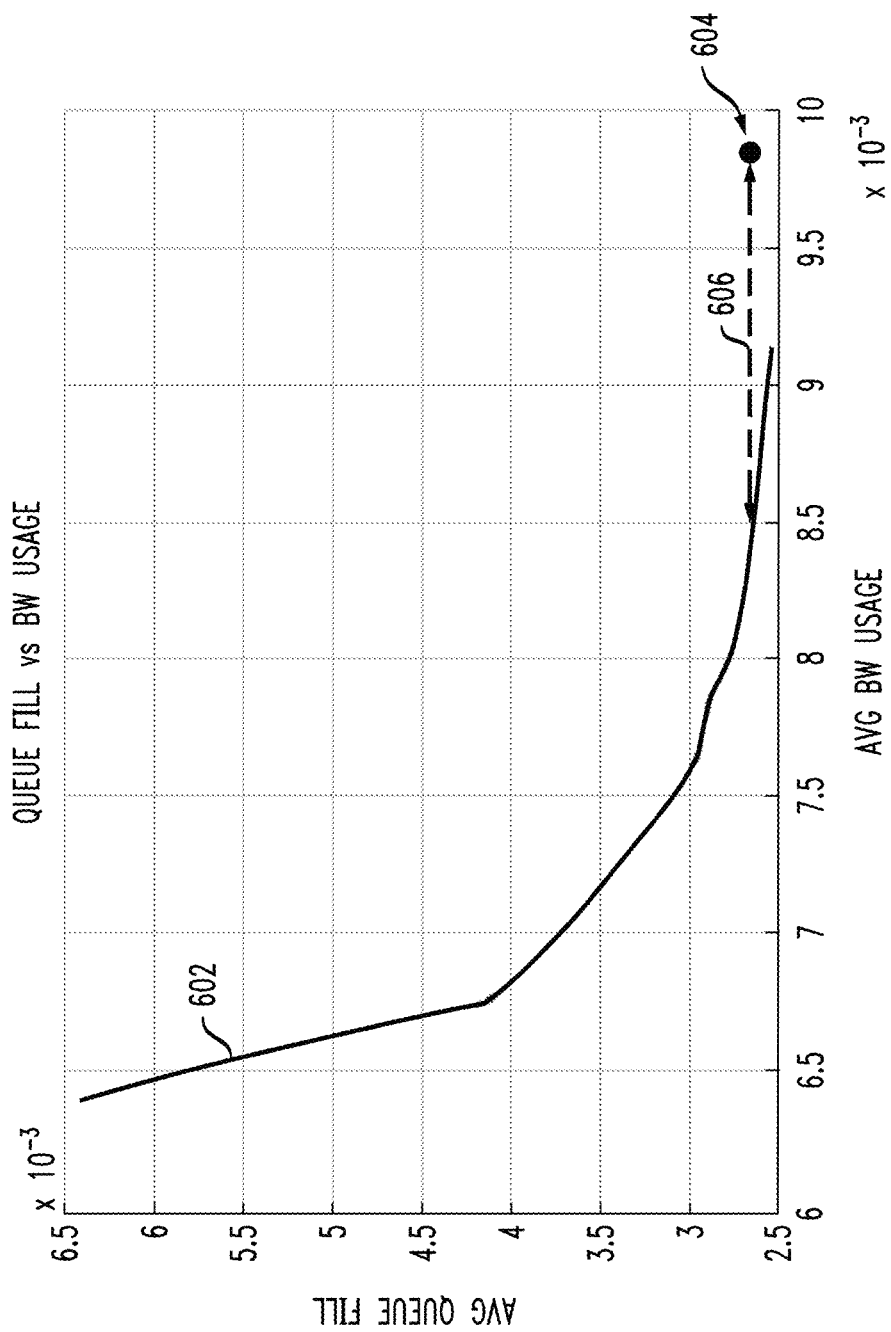
FIG. 6 graphically shows example improvements that can be achieved in the communication system of FIG. 2 according to an embodiment.

FIG. 6 graphically shows example improvements that can be achieved in system 200 based on these example implementations of method 400 and buffer queue 500. More specifically, in FIG. 6, curve 602 shows simulation results illustrating the behavior of average occupancy (fill) of buffer queue 500 as a function of average bandwidth (BW) usage that can be achieved on a pareto basis in system 200 according to an example embodiment. Point 604 quantifies the performance of the same system 200 when being controlled by a conventional DBA algorithm. The arrow 606 indicates that the above-described embodiment of method 400 can beneficially outperform said conventional DBA algorithm in terms of the average bandwidth usage by ca. 15% at the same average fill of buffer queue 500.

Figure 8A:
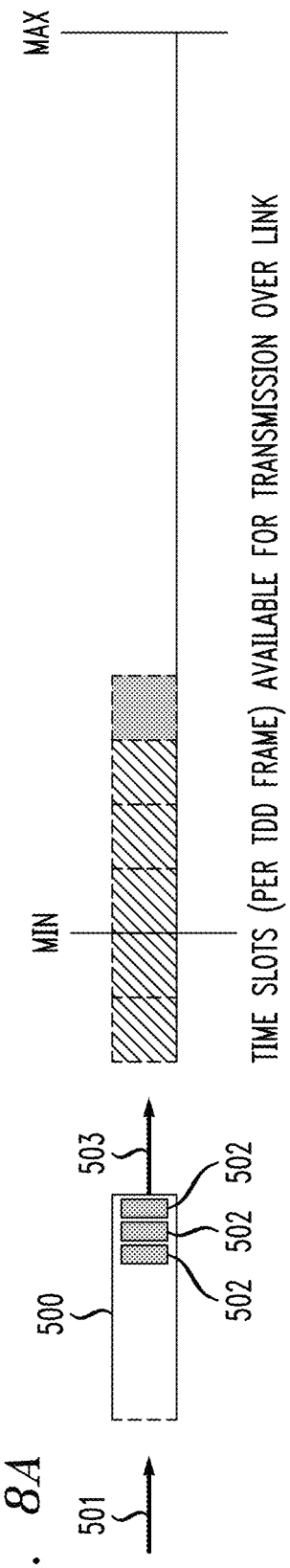
FIGS. 8A-8C illustrate different example configurations of the communication system of FIG. 1 in which the DRA control method of FIG. 4A can be practiced according to another embodiment.
Figure 8B:
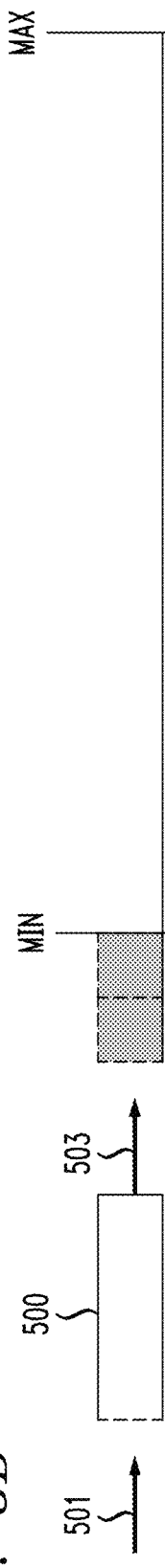
Figure 8C:
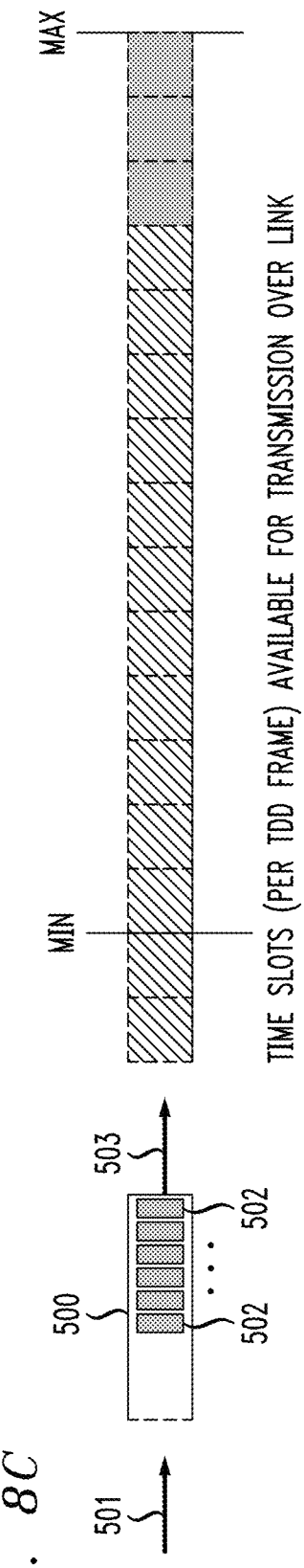
Figure 9:
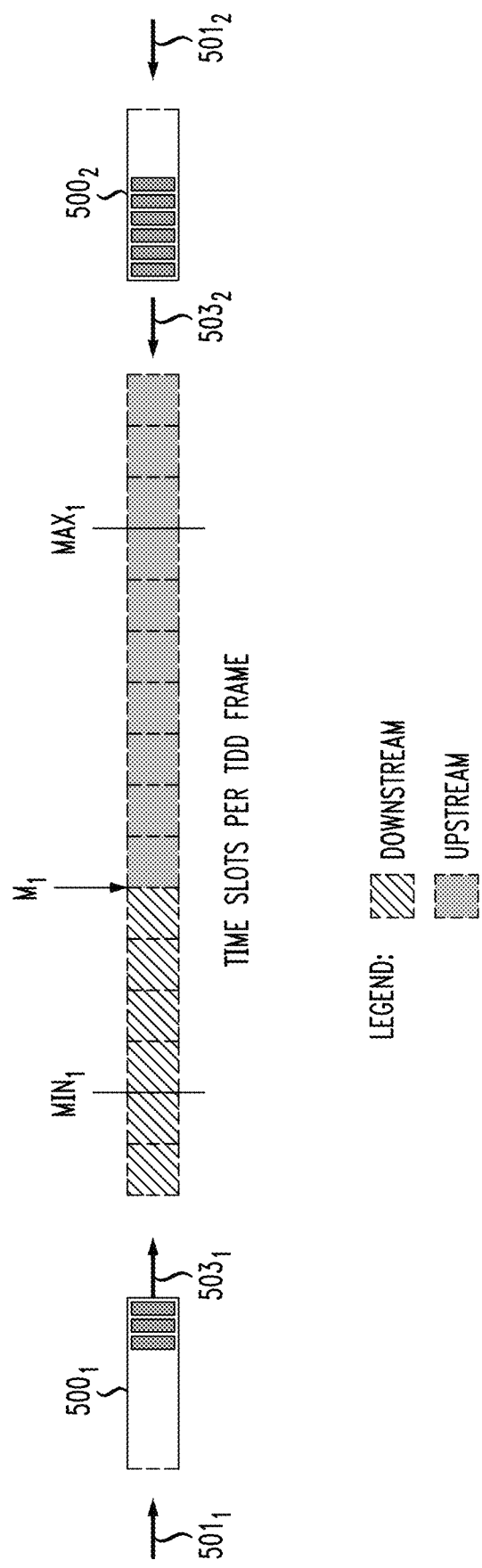
FIG. 9 illustrates an example configuration of the communication system of FIG. 1 in which the DRA control method of FIG. 4A can be practiced according to yet another embodiment.
Figure 10:
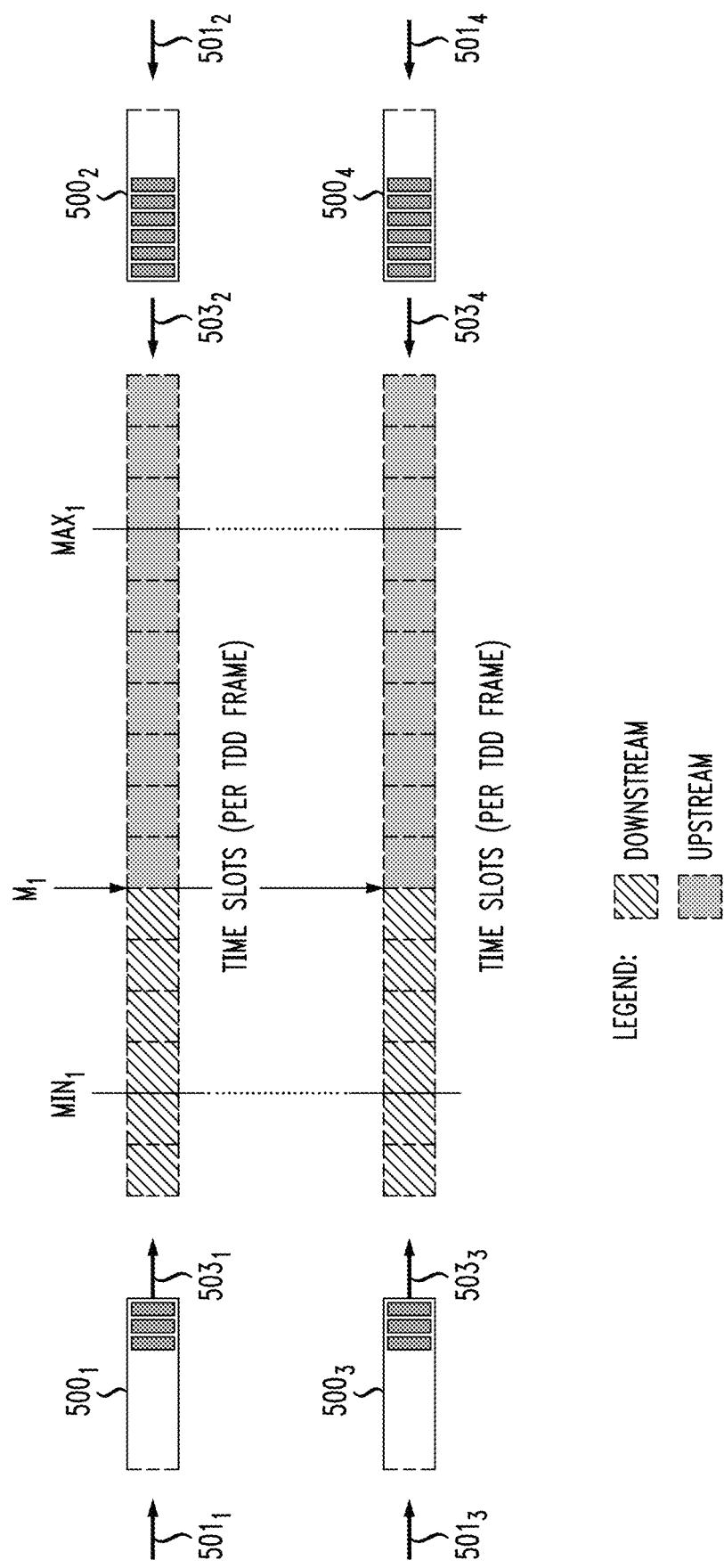
FIG. 10 illustrates an example configuration of the communication system of FIG. 1 in which the DRA control method of FIG. 4A can be practiced according to still another embodiment.

FIGS. 7-10 illustrate different example configurations of system 100 (FIG. 1) in which method 400 can be practiced according to an embodiment. More specifically, FIGS. 7-8 illustrate several scenarios, in which method 400 is being used to optimize discontinuous operation of a single buffer queue 500 in system 100. FIG. 9 illustrates the use of method 400 for independent dynamic time assignment (iDTA) of transmission opportunities for one upstream buffer queue 500 and one downstream buffer queue 500. FIG. 10 illustrates the use of method 400 for coordinated dynamic time assignment (cDTA) of transmission opportunities for multiple upstream and downstream queues 500.

Figure 7A:
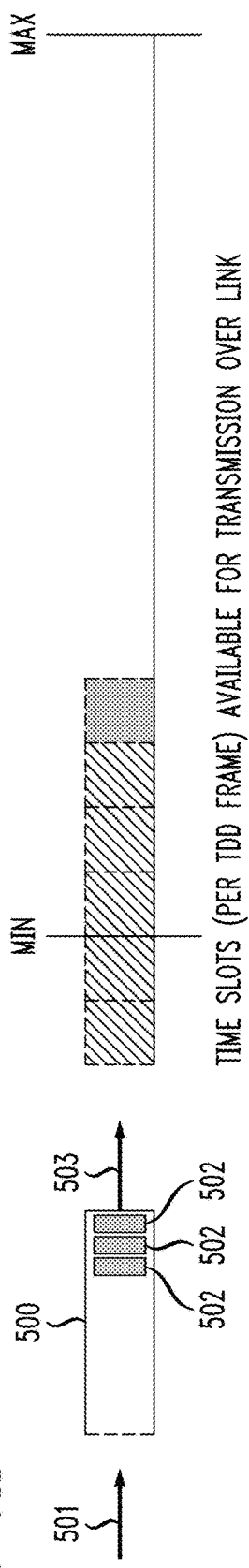
FIGS. 7A-7C illustrate different example configurations of the communication system of FIG. 1 in which the DRA control method of FIG. 4A can be practiced according to an embodiment.
Figure 7B:
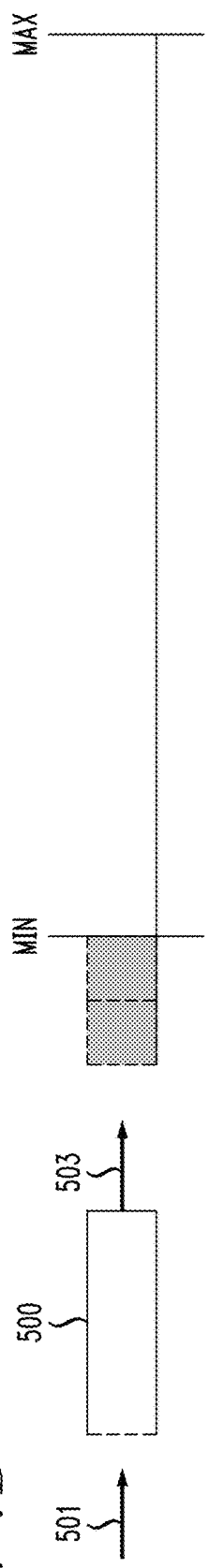
Figure 7C:
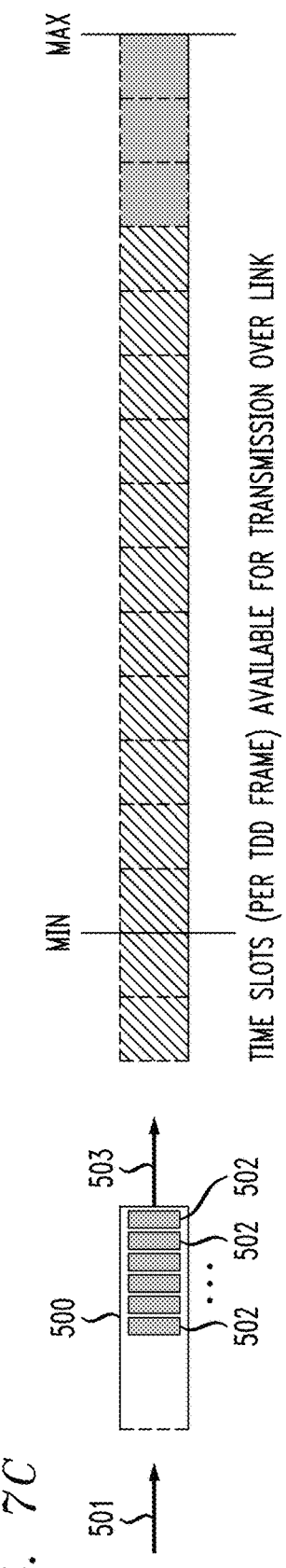

Under the system settings corresponding to FIGS. 7A-7C, the egress flow 503 is related to the number of time slots per TDD frame that can be allocated for data transmission. Said number of time slots can be set to any selected value from a minimum number (MIN) to a maximum number (MAX). Each of FIGS. 7A-7C illustrates a different respective moment in time characterized by: (i) a different corresponding occupancy B(k) (also see FIG. 5) of the buffer queue; and (ii) a different respective number of allocated time slots.

More specifically, FIG. 7A shows a situation in which buffer queue 500 has a moderate amount of data units 502, and method 400 causes DRA controller 320 to allocate an intermediate (between MIN and MAX) number of time slots to the buffer queue. FIG. 7B shows a situation in which buffer queue 500 is empty, and method 400 causes DRA controller 320 to allocate the minimum number (MIN) of time slots to the buffer queue. FIG. 7C shows a situation in which buffer queue 500 has a relatively large amount data units 502, and method 400 causes DRA controller 320 to allocate the maximum number (MAX) of time slots to the buffer queue. To achieve this type of behavior, optimization objective 352 is formulated to keep the occupancy B(k) of buffer queue 500 relatively low while attempting to minimize the number of allocated time slots. This particular optimization objective 352 implements a tradeoff between the delay performance (related to B(k)) and power consumption (related to the number of allocated time slots) of the corresponding transmitter.

The system settings corresponding to FIGS. 8A-8C are similar to the system settings corresponding to FIGS. 7A-7C, except that the feedback mechanism now corresponds to the actual egress volume or the actual number of time slots per TDD frame filled with data. In some pertinent literature, this system configuration may be referred to as non-status reports or traffic-monitoring mode. In this mode, at a first time, DRA controller 320 allocates a first number of time slots for transmission during an upcoming time interval. During that time interval, the actual number of time slots filled with data is counted and reported back to DRA controller 320, e.g., via signal 312. In response to the report, DRA controller 320 operates to determines a second number of time slots for the next upcoming time interval using an embodiment of method 400. Note that, herein, a time slot that is not loaded with payload data can be loaded with idle data. Transmission of idle data does not typically result in significant power savings. The optimization objective 352 can therefore be formulated to minimize the transmission of idle data while still aiming at keeping the backlog of data units 502 in buffer queue 500 at a relatively low level.

FIG. 9 illustrates a data link implemented over a single twisted-pair or coaxial cable 140. Buffer queue $500_1$ is used for downstream transmissions, with the corresponding ingress and egress flows being labeled $501_1$ and $503_1$, respectively. Buffer queue $500_2$ is similarly used for upstream transmissions, with the corresponding ingress and egress flows being labeled $501_2$ and $503_2$, respectively. Herein, a TDD frame has a set of DMT-symbol positions that can be used for downstream transmission and a set of DMT-symbol positions that can be used for upstream transmission, e.g., as indicated in FIG. 9. The sum of the downstream and upstream DMT-symbol positions is constant (e.g., 35 DMT-symbol positions for a specific G.fast profile). The parameter $M_1$ represents the number of DMT-symbol positions allocated for downstream transmission in the TDD frame. This parameter also controls the number of DMT-symbol positions allocated for upstream transmission because the sum of the downstream and upstream DMT-symbol positions is constant. The value of $M_1$ can be dynamically changed by DRA controller 320 based on the fills of buffer queues $500_1$ and $500_2$, or based on suitable traffic-monitoring information. The range within which the value of $M_1$ can change is from the number $MIN_1$ to the number $MAX_1$, both of which are indicated in FIG. 9.

FIG. 10 illustrates a data link implemented over two twisted-pair or coaxial cables 140. Buffer queue $500_1$ is used for downstream transmissions over the first one of the two cables, with the corresponding ingress and egress flows being labeled $501_1$ and $503_1$, respectively. Buffer queue $500_3$ is similarly used for downstream transmissions over the second one of the two cables, with the corresponding ingress and egress flows being labeled $501_3$ and $503_3$, respectively. Buffer queue $500_2$ is used for upstream transmissions over the first one of the two cables, with the corresponding ingress and egress flows being labeled $501_2$ and $503_2$, respectively. Buffer queue $500_4$ is similarly used for upstream transmissions over the second one of the two cables, with the corresponding ingress and egress flows being labeled $501_4$ and $503_4$, respectively. Herein, the same values of $M_1$, $MIN_1$, and $MAX_1$ are applied to the TDD frames of both transmission lines to avoid near-end crosstalk interference between upstream and downstream signals. Extension of the shown configuration to data links implemented over three or more twisted-pair or coaxial cables 140 is fairly straightforward.

In an example embodiment corresponding to the systems illustrated in FIGS. 9-10, step 402 of method 400 may be implemented such that the queue fills and/or egress rates of the upstream and downstream queues are used as the state-space variables. In this case, Eq. (7) may take, e.g., the following form:

$$S' = (M_F + 1) \cdot \max_n \lfloor E_n^U(k) \rfloor + \max_n \lfloor E_n^D(k) \rfloor \qquad (10)$$

where $M_F$ is the total number of time slots in a TDD frame; $E_n^U(k)$ is the egress rate in the k-th time interval for the n-th user in the upstream direction; and $E_n^D(k)$ is the egress rate in the k-th time interval for the n-th user in the downstream direction. The optimization objective 352 can be formulated, e.g., to minimize the number of idle time slots over time.

FIG. 11 shows example improvements that can be achieved in system 100 operating in the cDTA mode using method 400 in the configuration illustrated in FIG. 10. The first column of the table shown in FIG. 11 gives different values of the update period for which three different control algorithms are compared. The second column presents estimated performance characteristics of the algorithm under which the value of $M_1$ is fixed at $M_1=18$. The second column presents estimated performance characteristics of the DRA algorithm disclosed in European Patent Publication EP3182636A1, which is incorporated herein by reference in its entirety. The third column presents estimated performance characteristics of the DRA algorithm implemented using an embodiment of method 400. The performance characteristics are quantified using a deviation from the "optimal proportional fair allocation," under which downstream and upstream egress rates are controllably allocated in proportion to the maximum averaged downstream egress rate and the maximum averaged upstream egress rate, respectively. Better performance corresponds to a smaller absolute value of the shown metric. For example, it can be seen that an example embodiment of method 400 can outperform the prior-art cDTA algorithm by about 30% for the 30-ms update period. This improvement can advantageously manifest itself, e.g., in the improved QoS for the corresponding DSL system.

FIG. 12 shows a block diagram of a wireless communication system 1200 in which some alternative embodiments can be practiced. System 1200 includes a mobile terminal 1210, a plurality of mobile terminals $1220_1$-$1220_N$, and a base station 1230 operatively connected to a network core 1250. In an example embodiment, base station 1230 can be an instance of an evolved Node B (eNB) or a next-generation Node B (gNB). In the context of different generations (e.g., 3G, 4G, and/or 5G, or even future evolutions of 5G, such as 6G) of wireless networks, a mobile terminal, such as any of mobile terminals 1210 and $1220_1$-$1220_N$, may be referred to as user equipment (UE), and network core 1250 may be referred to as the evolved packet core (EPC). Base station 1230 may be a part of an evolved UMTS terrestrial radio access network (E-UTRAN) that has additional base stations (not explicitly shown in FIG. 12) operatively connected to base station 1230 and network core 1250 as known in the pertinent art, or form part of 5G, 6G, or future evolutions of wireless networks. Herein, the term UMTS stands for Universal Mobile Telecommunications System.

In an example embodiment, mobile terminal 1210 comprises at least one DSP 1212 coupled to at least one memory 1208 and interfaced to a radio-frequency (RF) transceiver 1214 that is connected to one or more antennas 1216 in a manner that enables the mobile terminal to establish and maintain a wireless link 1218 with base station 1230. In operation, wireless link 1218 enables mobile terminal 1210 to send uplink signals to base station 1230 and receive downlink signals from the base station, e.g., to support and carry a phone call or a data session. Each of mobile terminals $1220_1$-$1220_N$ can be functionally and/or structurally similar to mobile terminal 1210. In some embodiments, mobile terminals $1220_1$-$1220_N$ may not be present. In various embodiments, mobile terminal 1210 can be a cellular telephone, a smartphone, a handheld computer, a personal media device, a smart watch, an IoT device, a gaming device, a smart car, etc.

In an example embodiment, base station 1230 comprises at least one DSP 1232 coupled to at least one memory 1228 and interfaced to an RF transceiver 1234 that is connected to a plurality of antennas $1236_1$-$1236_m$ in a manner that enables the base station to establish and support wireless link 1218 and/or one or more other wireless links (not explicitly shown in FIG. 12) with mobile terminals 1220$_1$-1220$_N$. For example, base station 1230 may broadcast data that enable mobile terminal 1210 to first select the cell served by the base station to be the serving cell and then establish wireless link 1218.

In an example embodiment, some or all of DSPs 1212 and 1232 and memories 1208 and 1228 can be used to implement at least some embodiments described in reference to FIGS. 3-5.

For example, in some embodiments, system 1200 may operate in accordance with the IEEE Standard 802.11-2016, which is incorporated herein by reference in its entirety. This standard specifies the use of QoS data frames, buffered-traffic queues, and transmission opportunities. As such, system 1200 may have a buffer queue (which can be associated with one or more traffic classes), communicate the queue-size information to an appropriate controller/scheduler, and use an embodiment of method 400 to allocate transmission opportunities (and/or other resources) to the corresponding wireless station(s) 1210, 1220, and/or 1230.

According to an example embodiment disclosed above, e.g., in the summary section and/or in reference to any one or any combination of some or all of FIGS. 1-12, provided is an apparatus comprising: at least one processor (e.g., 114, 118, FIG. 1; 202, 218, FIG. 2; 1212, 1232, FIG. 12); and at least one memory (e.g., 116, FIG. 1; 201, FIG. 2; 1208, 1228, FIG. 12) including program code; and wherein the at least one memory and the program code are configured to, with the at least one processor, cause the apparatus at least to: regulate an egress rate (e.g., $E(k+1)$, FIG. 4B) of a first buffer queue (e.g., 500, FIGS. 5, 7-8; 500$_1$, FIGS. 9-10) by selecting an egress-rate control parameter value (e.g., $R(k)$, FIG. 4B) of the first buffer queue for a next time interval (e.g., $T(k+1)$, FIG. 4B) based on quality values (e.g., Q-values, Eq. (1)) and on occupancy (e.g., $B(k)$ and/or $B(k+1)$, FIG. 4B) of the first buffer queue in a present time interval (e.g., $T(k)$, FIG. 4B); and update (e.g., according to Eq. (6)) a plurality of the quality values corresponding to a plurality of egress-rate control parameter values of the first buffer queue in the present time interval.

As used herein, the term "egress-rate control parameter value" is to be construed to encompass one or both of an egress-rate value and a limit (e.g., an upper limit $R(k)$) on the applicable egress-rate values.

As used herein, the term "occupancy" is to be construed to encompass a fill of a buffer queue (e.g., the metrics $B(k)$, $B(k+1)$ and/or a combination thereof), one or more other buffer-queue fill metrics (e.g., ingress rate(s), ingress volume(s), egress rate(s), egress volume(s), and different combinations thereof), and/or relevant traffic monitoring data, e.g., as may be found in status reports.

In some embodiments of the above apparatus, the apparatus comprises an electronic mapper (e.g., 340, FIG. 3) configured to update the plurality of the quality values corresponding to the plurality of egress-rate control parameter values of the first buffer queue in the present time interval based on the occupancy (e.g., $B(k)$ and/or $B(k+1)$, FIG. 4B) of the first buffer queue in the present and/or previous time interval.

In some embodiments of any of the above apparatus, the apparatus is configured to update the plurality of the quality values using extrapolation from a quality value corresponding to the egress-rate control parameter value selected in the present time interval.

In some embodiments of any of the above apparatus, the program code comprises a reinforcement-learning program.

In some embodiments of any of the above apparatus, the reinforcement-learning program does not support an exploration phase.

In some embodiments of any of the above apparatus, the at least one memory and the program code are further configured to, with the at least one processor, cause the apparatus to regulate an egress rate of at least a second buffer queue (e.g., 500$_2$, FIGS. 9-10) using the electronic mapper.

In some embodiments of any of the above apparatus, the first buffer queue is for downstream transmission; and wherein the second buffer queue is for upstream transmission.

In some embodiments of any of the above apparatus, both the first buffer queue and the second buffer queue are for downstream transmissions or for upstream transmissions.

In some embodiments of any of the above apparatus, the electronic mapper is configured to select the egress rate of the first buffer queue for the next time interval using a greedy selection policy (e.g., represented by Eq. (8)). As used herein, the term "greedy selection policy" excludes an ε-greedy policy or other selection policies under which suboptimal or random actions may be taken with some nonzero probability.

In some embodiments of any of the above apparatus, the electronic mapper is configured not to make a random selection of the egress rate of the first buffer queue for the next time interval.

In some embodiments of any of the above apparatus, the apparatus comprises an access node (e.g., 110, FIG. 1) to transmit data from the first buffer queue, through a subscriber line (e.g., 140$_1$, FIG. 1), to a customer-premise-equipment unit (e.g., 140$_1$, FIG. 1).

In some embodiments of any of the above apparatus, the apparatus comprises a customer-premise-equipment unit (e.g., 140$_1$, FIG. 1) to transmit data from the first buffer queue, through a subscriber line (e.g., 140$_1$, FIG. 1), to an access node (e.g., 110, FIG. 1). In some embodiments of any of the above apparatus, the apparatus comprises an optical line terminal (e.g., 210, FIG. 2) to transmit data from the first buffer queue, through an optical fiber (e.g., 224, FIG. 2), to an optical network unit (e.g., 260$_1$, FIG. 2).

In some embodiments of any of the above apparatus, the apparatus comprises an optical network unit (e.g., 260$_1$, FIG. 2) to transmit data from the first buffer queue, through an optical fiber (e.g., 224, FIG. 2), to an optical line terminal (e.g., 210, FIG. 2).

In some embodiments of any of the above apparatus, the egress rate determines bandwidth allocation for the first buffer queue.

In some embodiments of any of the above apparatus, the egress rate determines allocation of transmission opportunities for the first buffer queue in a time-division-duplexing frame.

In some embodiments of any of the above apparatus, the egress rate determines allocation of transmission opportunities for the first buffer queue using time division multiplexing.

In some embodiments of any of the above apparatus, the apparatus comprises a base station (e.g., 1230, FIG. 12) of a wireless communication system (e.g., 1200, FIG. 12) operatively connected to the at least one processor and the at least one memory.

According to another example embodiment disclosed above, e.g., in the summary section and/or in reference to any one or any combination of some or all of FIGS. 1-12, provided is a non-transitory machine-readable medium, having encoded thereon program code, wherein, when the program code is executed by a machine, the machine implements a method comprising the steps of: regulating (e.g., at 406, FIG. 4A) an egress rate (e.g., E(k+1), FIG. 4B) of a first buffer queue (e.g., 500, FIGS. 5, 7-8; $500_1$, FIGS. 9-10) by selecting an egress-rate control parameter value (e.g., R(k), FIG. 4B) of the first buffer queue for a next time interval (e.g., T(k+1), FIG. 4B) based on quality values (e.g., Q-values, Eq. (1)) and on occupancy (e.g., B(k) and/or B(k+1), FIG. 4B) of the first buffer queue in a present time interval (e.g., T(k), FIG. 4B); and updating (e.g., at 412, FIG. 4A, according to Eq. (6)) a plurality of the quality values corresponding to a plurality of egress-rate control parameter values of the first buffer queue in the present time interval.

In some embodiments of the above non-transitory machine-readable medium, the step of updating comprises using an electronic mapper (e.g., 340, FIG. 3) configured to update the plurality of the quality values corresponding to the plurality of egress-rate control parameter values of the first buffer queue in the present time interval based on the occupancy (e.g., B(k) and/or B(k+1), FIG. 4B) of the first buffer queue in the present time interval.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods described herein.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus comprising:
   at least one processor; and
   at least one memory including program code; and
   wherein the at least one memory and the program code are configured to, with the at least one processor, cause the apparatus at least to:
   regulate an egress rate of a first buffer queue by selecting an egress-rate control parameter value of the first buffer queue for a next time interval based on quality values and on occupancy of the first buffer queue in a present time interval, wherein the quality values quantify rewards for specific egress-rate control parameter values at a specific state; and
   update a plurality of the quality values corresponding to a plurality of egress-rate control parameter values of the first buffer queue in the present time interval.

2. The apparatus of claim 1, wherein the apparatus comprises an electronic mapper configured to update the plurality of the quality values corresponding to the plurality of egress-rate control parameter values of the first buffer queue in the present time interval based on the occupancy of the first buffer queue in the present time interval.

3. The apparatus of claim 1, wherein the at least one memory and the program code are configured to, with the at least one processor, cause the apparatus to update the plurality of the quality values using extrapolation from a quality value corresponding to the egress-rate control parameter value selected in a previous time interval.

4. The apparatus of claim 1, wherein the program code comprises a reinforcement-learning program.

5. The apparatus of claim 4, wherein the reinforcement-learning program does not support an exploration phase.

6. The apparatus of claim 1, wherein the at least one memory and the program code are further configured to, with the at least one processor, cause the apparatus to regulate an egress rate of at least a second buffer queue.

7. The apparatus of claim 6,
   wherein the first buffer queue is for downstream transmission; and
   wherein the second buffer queue is for upstream transmission.

8. The apparatus of claim 6, wherein both the first buffer queue and the second buffer queue are for downstream transmissions or for upstream transmissions.

9. The apparatus of claim 1, wherein the at least one memory and the program code are further configured to, with the at least one processor, cause the apparatus to select the egress-rate control parameter value of the first buffer queue for the next time interval using a greedy selection policy.

10. The apparatus of claim 1, wherein the at least one memory and the program code are further configured to, with the at least one processor, cause the apparatus not to make a random selection of the egress-rate control parameter value of the first buffer queue for the next time interval.

11. The apparatus of claim 1, further comprising an access node to transmit data from the first buffer queue, through a subscriber line, to a customer-premise-equipment unit.

12. The apparatus of claim 1, further comprising a customer-premise-equipment unit to transmit data from the first buffer queue, through a subscriber line, to an access node.

13. The apparatus of claim 1, further comprising an optical line terminal to transmit data from the first buffer queue, through an optical fiber, to an optical network unit.

14. The apparatus of claim 1, further comprising an optical network unit to transmit data from the first buffer queue, through an optical fiber, to an optical line terminal.

15. The apparatus of claim 1, wherein the egress-rate control parameter value determines bandwidth allocation for the first buffer queue.

16. The apparatus of claim 1, wherein the egress-rate control parameter value determines allocation of transmission opportunities for the first buffer queue in a time-division-duplexing frame.

17. The apparatus of claim 1, wherein the egress-rate control parameter value determines allocation of transmission opportunities for the first buffer queue using time-division multiplexing.

18. The apparatus of claim 1, wherein the apparatus comprises a base station of a wireless communication system operatively connected to the at least one processor and the at least one memory.

19. A non-transitory machine-readable medium, having encoded thereon program code, wherein, when the program code is executed by a machine, the machine implements a method comprising:
   regulating an egress rate of a first buffer queue by selecting an egress-rate control parameter value of the first buffer queue for a next time interval based on quality values and on occupancy of the first buffer queue in a present time interval, wherein the quality values quantify rewards for specific egress-rate control parameter values at a specific state; and
   updating a plurality of the quality values corresponding to a plurality of egress-rate control parameter values of the first buffer queue in the present time interval.

20. The non-transitory machine-readable medium of claim 19, wherein the updating comprises using an electronic mapper configured to update the plurality of the quality values corresponding to the plurality of egress-rate control parameter values of the first buffer queue in the present time interval based on the occupancy of the first buffer queue in the present time interval.

* * * * *